(12) United States Patent
Hansen et al.

(10) Patent No.: US 7,727,396 B1
(45) Date of Patent: Jun. 1, 2010

(54) ANAEROBIC REACTOR WITH AUGER IN THE EFFLUENT LINE

(75) Inventors: Conly L. Hansen, North Logan, UT (US); Carl S. Hansen, Garland, UT (US); Edward D. Watts, North Logan, UT (US); Kevin D. Pack, North Logan, UT (US); Jacob Shaun Dustin, Logan, UT (US); John C. Milligan, North Logan, UT (US)

(73) Assignee: Utah State University, Logan, UT (US)

( * ) Notice: Subject to any disclaimer, the term of this patent is extended or adjusted under 35 U.S.C. 154(b) by 58 days.

(21) Appl. No.: 12/326,710

(22) Filed: Dec. 2, 2008

(51) Int. Cl.
*C02F 3/28* (2006.01)
(52) U.S. Cl. ...................... 210/603; 210/617
(58) Field of Classification Search ............... 210/603, 210/608, 615–617; 435/289.1, 300.1
See application file for complete search history.

(56) References Cited

U.S. PATENT DOCUMENTS

| | | | |
|---|---|---|---|
| 4,350,588 A * | 9/1982 | Tsubota | 210/208 |
| 4,372,856 A * | 2/1983 | Morrison | 210/603 |
| 4,396,402 A * | 8/1983 | Ghosh | 48/197 A |
| 4,758,344 A * | 7/1988 | Wildenauer | 210/603 |
| 6,613,562 B2 * | 9/2003 | Dvorak | 435/290.4 |
| 2009/0123965 A1 * | 5/2009 | Wahl | 435/68.1 |

FOREIGN PATENT DOCUMENTS

DE    10314933 A1 * 10/2004

* cited by examiner

Primary Examiner—Fred Prince (57) ABSTRACT

An upflow anaerobic reactor includes an effluent outlet configured to direct effluent out of the reactor and a fluid-filled gas trap configured to prevent loss of biogas from the vessel. An auger assembly is operably coupled to the effluent outlet to prevent clogging of the effluent outlet by solid matter that tends to collect in the effluent outlet. The auger assembly includes at least one helical screw conveyor that rotates so as to remove solid material that collects in the effluent outlet. auger assembly can be operated on a continuous or semi-continuous basis so as to allow for continuous operation of the reactor. The auger assembly can be operated on a continuous or semi-continuous basis so as to allow for continuous operation of the reactor.

22 Claims, 6 Drawing Sheets

ANAEROBIC REACTOR WITH AUGER IN THE EFFLUENT LINE

CROSS-REFERENCE TO RELATED APPLICATIONS

U.S. Pat. No. 6,911,149 entitled "INDUCED SLUDGE BED ANAEROBIC REACTOR," U.S. Pat. No. 7,290,669 entitled "UPFLOW BIOREACTOR HAVING A SEPTUM AND AN AUGER AND DRIVE ASSEMBLY," and U.S. patent application Ser. No. 11/272,293 filed Nov. 10, 2005, now U.S. Pat. No. 7,452,467, entitled "INDUCED SLUDGE BED ANAEROBIC REACTOR" are hereby incorporated by reference in their entirety.

BACKGROUND OF THE INVENTION

1. The Field of the Invention

The present invention relates to upflow anaerobic reactors that are designed for biodegradation of biodegradable matter and production of biogas therefrom. In particular, the present invention relates to apparatuses and methods for preventing clogging of the effluent line of an upflow anaerobic reactor.

2. The Relevant Technology

A bioreactor is a device that uses bacteria to promote biodegradation or "digestion" of organic waste materials into simple organics and gaseous biogas products. Biogas is typically a mixture of methane, carbon dioxide, hydrogen sulfide, and other volatile organic compounds. If produced in sufficient quantities, the methane gas can be used as a fuel.

A bioreactor can also be used to treat and detoxify organic waste matter and wastewater. Wastewater treatment has always been important, particularly in agricultural production and food processing, which produces wastewater containing high concentrations of organic matter.

Anaerobic digestion is one traditional method of treating wastewater containing high concentrations of organic matter. Anaerobic digestion removes large quantities of organic matter from the waste material and produces biogas as a useful byproduct. Anaerobic digestion is particularly suitable for wastewater containing high concentrations of organics, such as wastewater generated through agricultural production and processing.

Many attempts have been made to decompose organic waste using closed vessels. One type of closed vessel reactor that has shown high decomposition rates is the upflow anaerobic sludge blanket reactor. In this reactor, waste material is introduced into the bottom of the reactor and forced up through the vessel where it passes through a blanket of bacteria, which decompose the organic material and produces biogas that can be collected and used as a fuel.

To achieve high decomposition rates in an upflow bioreactor, the bacterial culture should be well established. Once the bacterial culture is well established, the upflow bioreactor can be operated continuously and a high rate of digestion can be maintained for an extended period of time (e.g., months or even years).

BRIEF SUMMARY OF THE INVENTION

The present invention relates to a bioreactor and operation of a bioreactor for biodegradation of biodegradable matter and collection of a biogas that is a product of the biodegradation. In particular, the present invention relates the operation of upflow anaerobic reactor wherein an influent is introduced via the lower portion of the vessel and an effluent is withdrawn via the upper portion of the vessel. As the influent travels through the reactor from bottom to top, biodegradable materials are broken down by an anaerobic bacterial culture producing large quantities of valuable biogas and treated effluent. Treated effluent, which includes liquid and solid materials (i.e., digested and non-digestible solids that can be sold as valuable compost), is withdrawn form the upper portion of the vessel via an effluent outlet. The effluent outlet includes an auger assembly that prevents clogging of the outlet while allowing liquids and digested solids to pass therethrough.

In one embodiment, the upflow anaerobic reactor includes a vessel having an upper portion and a lower portion that define a volume of the vessel, an effluent outlet coupled to the upper portion of the vessel, an auger assembly operably coupled to the effluent outlet, an inlet coupled to the vessel for introducing biodegradable matter into the lower portion of the vessel, and a gas port coupled to the upper portion of the vessel for collecting biogas produced in the vessel. The effluent outlet includes a column of liquid that forms a fluid-filled gas trap inside the outlet to prevent escape of biogas via the outlet. The fluid-filled gas trap also forms a fluid-air interface where the effluent contacts atmospheric air as it flows out of the reactor.

The solid materials in the effluent (i.e., digested and non-digested solids) are, however, susceptible to collecting at the fluid-air interface. As such, the auger assembly is operably coupled to the effluent outlet and positioned at or through the fluid-air interface in order to prevent clogging of the effluent outlet by solids in the effluent stream. That is, the auger assembly is positioned within the effluent outlet at the fluid-air interface so as to disrupt a solid material in the effluent collecting at the fluid-air interface. The auger assembly can include at least one helical screw conveyor that rotates so as to remove solid material from the fluid-air interface. Solid materials that collect at the fluid-air interface can be removed from the effluent outlet by rotating the auger to either draw solid material up and out of the effluent outlet and/or push solid material in the effluent outlet back into the vessel. The auger assembly can be operated on a continuous or semi-continuous basis so as to allow for continuous operation of the reactor.

In one embodiment, the auger assembly includes at least one screw conveyor A screw conveyor is typically a helical screw having a longitudinal axis that can, when rotated either clockwise or counter-clockwise by a drive assembly, draw solid material up and out of the effluent outlet and/or push solid material in the effluent outlet back into the vessel.

In one embodiment, the screw conveyor includes an outer housing and a sleeve housing that at least partially enclose the screw conveyor. The outer housing and the sleeve housing are inserted into the effluent outlet such that the screw conveyor, the outer housing, and the sleeve housing can readily be coupled to the effluent outlet or uncoupled so that the screw conveyor can be removed for repair or replacement.

In another embodiment, auger assembly includes a screw pump operatively coupled to the effluent outlet. A screw pump is similar to an auger or a screw conveyor with the exception that the housing contains two or more intermeshing helical screws that rotate axially about one another so as to pump fluid and material through the housing and out the effluent outlet. Preferably, at least one of the helical screws of the screw pump pierces or passes through the fluid-air interface such that rotation of the two or more intermeshing helical screws disrupts solids that tend to collect at the fluid-air interface. A screw pump may be advantageous because the mechanical vibration produced by a screw pump is typically low, which may minimize churning and foaming.

In one embodiment, the screw conveyor in an auger assembly or screw pump can be rotated continuously or semi-continuously in order to save energy and prevent unnecessary wear. The interval between rotations of the screw conveyor may depend on the amount of solid matter in the effluent.

In one embodiment, the upflow anaerobic reactor further includes a septum positioned in the upper portion of the vessel. The septum includes a central aperture to create fluid connection between the upper portion and lower portion of the vessel. The septum is positioned in the upper portion of the vessel so as to maintain the bacterial culture below the septum.

In one embodiment, the upflow anaerobic reactor further includes an internal auger device (i.e., a second auger separate and distinct from the auger assembly that is included in the effluent outlet (see, e.g., FIG. 1)) operatively coupled to the vessel and positioned within the aperture of the septum so as to prevent clogging of the aperture. The internal auger device includes a screw conveyor having sloping fins to move solids from just above the aperture in the septum downward to some distance beyond the bottom of the aperture toward a lower zone in the bioreactor. Alternatively, the internal auger can pull solids up through the hole and above the septum where the solids can be removed from the vessel.

In one embodiment, the upflow anaerobic reactor further includes a pressure sensor for monitoring gas pressure in the vessel. The pressure sensor is preferably coupled to the auger assembly or the screw pump device in the effluent outlet. In one embodiment, a rise in pressure indicates a clog of solid material in the effluent outlet, which actuates the drive assembly and initiates rotation of the screw conveyor so as to clear the clog in the effluent outlet.

In one embodiment, the present invention includes a method for continuous operation of an upflow anaerobic reactor for biodegradation of biodegradable matter and collecting biogas produced therefrom. The method includes steps of (1) providing an upflow anaerobic reactor that includes an effluent outlet having a fluid-filled gas trap and an auger assembly coupled to the effluent outlet, (2) providing a bacterial culture comprising a sludge layer in the lower portion of the vessel for biodegradation of biodegradable material and production of biogas therefrom, (3) operating the upflow anaerobic reactor so as to create an upflow in the vessel by introducing an influent containing biodegradable material into the lower portion of the vessel via the inlet, and withdrawing an effluent from the upper portion of the vessel via the effluent outlet, and (4) rotating the auger assembly so as to disrupt solid material contained in the effluent outlet at the fluid-air interface.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

I. Introduction

The present invention relates to a bioreactor and operation of a bioreactor for biodegradation of biodegradable matter and collection of a biogas that is a product of the biodegradation. In particular, the present invention relates the operation of upflow anaerobic reactor wherein an influent is introduced via the lower portion of the vessel and an effluent is withdrawn via the upper portion of the vessel. As the influent travels through the reactor from bottom to top, biodegradable materials are broken down by an anaerobic bacterial culture producing large quantities of valuable biogas. Treated effluent, which includes liquid and solid materials (i.e., digested and non-digestible solids), is withdrawn form the upper portion of the vessel via an effluent outlet. To prevent clogging of the effluent line, the effluent outlet includes an auger assembly configured to disrupt solids that collect at the fluid-air interface while allowing liquids and digested solids to pass therethrough.

II. Upflow Bioreactors

Figure 1:
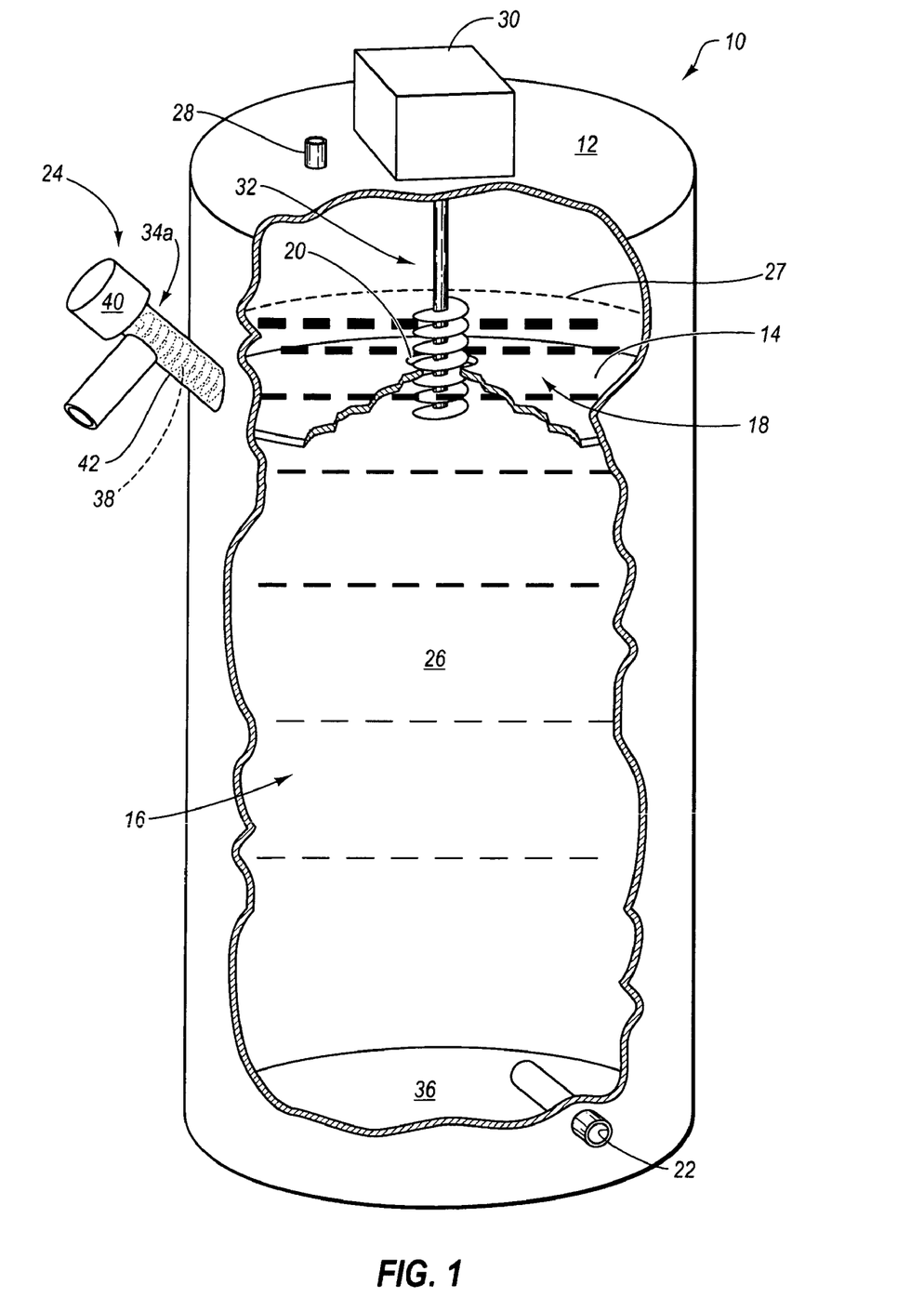
FIG. 1 illustrates an example of an upflow anaerobic reactor for digesting organic material.

FIG. 1 illustrates an upflow anaerobic reactor 10 according to one embodiment of the present invention. Reactor 10 includes a vessel 12 in which biodegradable matter (e.g., sewage or wastewater) can be introduced and held for treatment. A septum 14 is positioned in vessel 12 to form a lower chamber 16 (i.e., a lower portion) and an upper chamber 18 (i.e., an upper portion). An aperture 20 in septum 14 provides fluid communication between lower chamber 16 and upper chamber 18. According to one embodiment of the present invention, reactor 10 includes an internal auger 32 to facilitate the retention of solids suspended in the effluent passing through aperture 20 and to prevent the aperture 20 from becoming plugged. A drive assembly 30 generates and/or transfers a force for turning internal auger 32.

Reactor 10 is configured for upflow operation. An inlet 22 is provided in lower chamber 16 for introducing biodegradable matter. A pump (not shown) is typically coupled to inlet 22 to provide pressure for introducing the organic material. An effluent outlet 24 is placed in upper chamber 18 to allow effluent to exit reactor 10. The placement of inlet 22 in lower chamber 16 and the placement of outlet 24 in upper chamber 18 creates an upflow in reactor 10 during operation. The upflow in reactor 10 can be operated continuously or semi-continuously by maintaining a continuous or semi-continuous flow of influent into lower chamber 16.

The effluent outlet 24 is designed to direct liquid and solid effluent out of the vessel while also preventing escape of biogas from the upflow anaerobic reactor 10. As such, the effluent outlet 24 includes a column of liquid that forms a fluid-filled gas trap 42 inside the outlet 24 and a fluid-air interface 48 where the effluent contacts atmospheric air as it flows out of the reactor. Because solid materials in the effluent are susceptible to collecting at the fluid-air interface 48 and plugging the outlet 24, the outlet includes an auger assembly 34a that is operably coupled to the effluent outlet 24 and positioned at or through the fluid-air interface 48 in order to prevent clogging of the effluent outlet 24. Effluent outlet 24 and auger assembly 34a are described in more detail below.

Lower chamber 16 includes a biomass 26. Biomass 26 is also referred to herein as a sludge layer. Biomass 26 includes a microbial culture and biodegradable matter. The upflow in reactor 10 is sufficiently slow that a sludge blanket of bacteria can form in the biomass 26 of lower chamber 16. The biodegradable matter (e.g., animal waste and wastewater) is slowly forced up through the sludge blanket where it is decomposed into smaller organic molecules and biogas. The microbial culture present in biomass 26 is selected according to the particular organic material that is to be decomposed in reactor 10. In an exemplary embodiment, the microbial culture includes anaerobic bacteria.

In one embodiment, the type of microbial culture and type of organic material are selected such that the decomposition of the organic material produces biogas. Upper chamber 18 can be sealed such that biogas collects within upper chamber 18. A gas outlet 28 allows the biogas to be ported out of reactor 10. The biogas can advantageously be used as a fuel. For example, if desired, the biogas can be burned and the heat can be used to maintain an optimal operating temperature in reactor 10.

In one embodiment, upper chamber 18 is sealed for the collection of biogas by configuring the effluent outlet 24 so that liquid and digested biodegradable matter (i.e., compost) can be withdrawn from the vessel 12 without allowing biogas to escape. As such, in one embodiment, the effluent outlet 24 includes a fluid-filled gas trap 42.

The fluids within vessel 12 have a fluid level 27 that is maintained by effluent outlet 24. The fluid level 27 is set below the top of vessel 12 such that a gas collection chamber is formed between the bioreactor fluids and the top of vessel 12.

Septum 14 is positioned within vessel 12 below fluid level. Septum 14 can be rigid or semi-rigid and can be made from any material compatible with the bioreactor fluids, including but not limited to plastics, metals, and the like. Septum 14 can be formed from a plurality of panels, or it can be a single, unitary piece of material. Septum 14 can be secured to the inside of the vessel 12 in any manner.

In one embodiment, septum 14 slopes upwardly from the sidewalls of vessel 12 toward aperture 20. Sloping septum 14 can facilitate the removal of materials that settle out in upper chamber 18. A sloped septum can also be advantageous for ensuring that biogas in lower chamber 16 is directed to aperture 20. However, the present invention can also be carried out using a flat septum.

An internal auger 32 is positioned within aperture 20 of septum 14. Internal auger 32 can be any device that can be positioned within aperture 20 and can move solids in a desired direction between or within upper and lower chambers 16 and 18. In an exemplary embodiment, the auger includes a shaft with one or more flanges that are configured to move a material in a direction parallel to the shaft.

In one embodiment, internal auger 32 creates a force that is opposite the flow of fluids in the bioreactor 10. For example, internal auger 32 can have a flange such that when internal auger 32 is rotated clockwise, the auger creates a force that is opposite the flow of the bioreactor fluids. During optimal or "normal" operating conditions, internal auger 32 is rotated in the direction that counters the flow of the bioreactor fluids. This counter-flow force tends to settle out solids suspended in the effluent passing through aperture 20. If aperture 20 becomes clogged, the auger can be rotated in an opposite direction to remove solids to above the septum 14 where the solids can be more easily removed.

Internal auger 32 and septum 14 are provided to help form and maintain biomass 26. By retaining the bacteria within the lower chamber 16, septum 14 and internal auger 32 retain more bacteria, which are available for breaking down the organic material being fed into reactor 10. By utilizing the auger and septum, organic materials can be treated much faster and much more efficiently than organic waste being digested in other bioreactors. In addition, use of the septum and auger improves the clarity of effluent exiting the bioreactor.

Essentially any organic material can be decomposed in reactor 10 so long as a microbial culture is available for degrading the organic material and the organic material can be introduced into the bioreactor in a form that can be mixed with the microbes. Examples of suitable organic materials that can be digested in the bioreactors of the present invention include animal wastes produced from the farming, ranching, and agricultural industries, food processing waste, human waste, and the like.

Figure 2A:
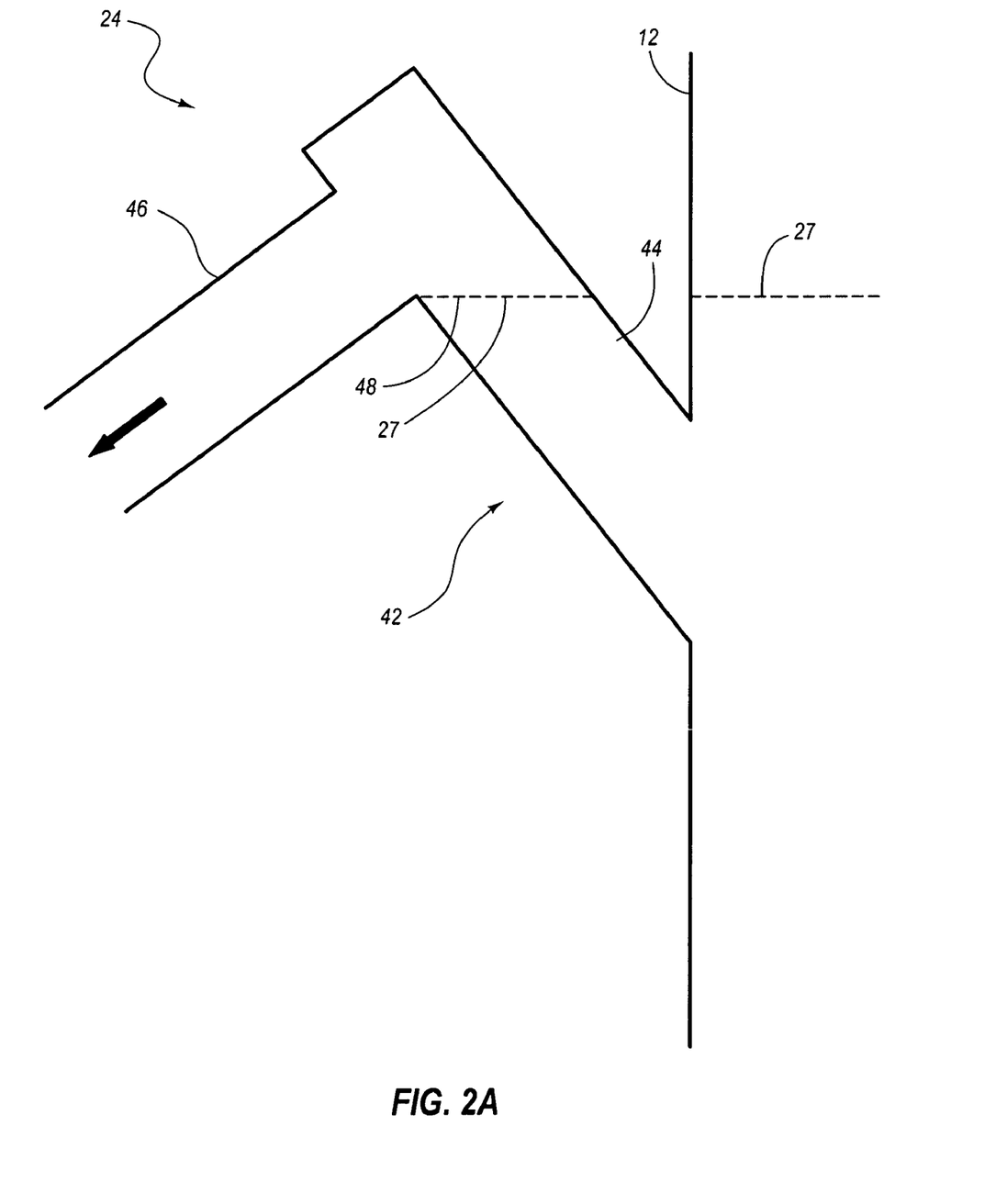
FIG. 2A illustrates an upflow anaerobic reactor and an effluent outlet with a fluid-filled gas trap.

Referring now FIG. 2A, a typical effluent outlet 24 having a fluid-filled gas-trap 48 is depicted (auger assembly 24 has been removed for clarity of illustrating the gas-trap 48). The effluent outlet 24 depicted in FIG. 2A is coupled to the upper portion of the vessel 12 and is designed to trap biogas produced by biodegradation of biological matter in the reactor 10 and prevent its escape. This allows the collection of the biogas from the reactor 10 via a gas port (28 in FIG. 1) that is also included in the upper portion of the reactor 10.

The effluent outlet 24 depicted in FIG. 2A includes a tube or pipe 44 that is angled up relative to the side of the vessel 12 such that the effluent outlet traps a column of liquid. This column of liquid acts as a fluid-filled gas trap 42 that prevents the escape of gasses through the effluent outlet 24. The column of liquid in the effluent outlet 24 depicted in FIG. 2A rises to a point where it is able to spill over into an effluent line 46 that is angled down and away from the reactor 10 such that it carries the effluent away from the reactor 10. The height of the column of liquid defines a fluid level 27 in the vessel 12. The portion of the effluent outlet where the column of liquid meets air is referred to as the fluid-air interface 48.

Figure 2B:
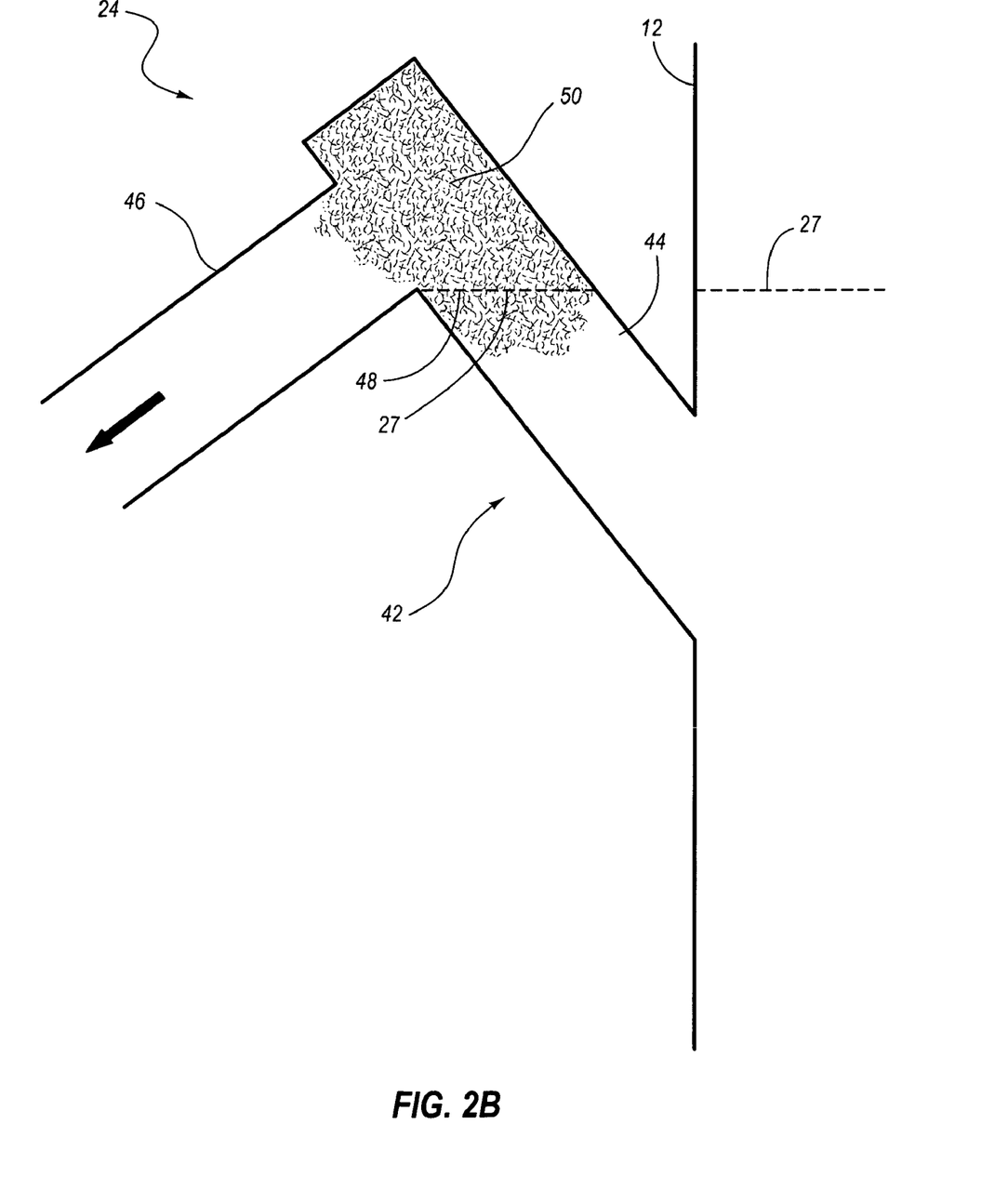
FIG. 2B illustrates an upflow anaerobic reactor and an effluent outlet with a fluid-filled gas trap without an auger assembly and having an undesired plug at a fluid-air interface.

While the effluent outlet 24 depicted in FIG. 2A is useful for preventing loss of biogas produced in the vessel 12, an effluent outlet like the one depicted in FIG. 2A without an auger assembly would be prone to clogging by solid material in the effluent that tends to collect at the fluid-air interface 48. FIG. 2B illustrates a problem associated with bioreactors that include a fluid-filled gas-trap 42 but that do not include an auger assembly in the effluent outlet 24. A typical clog is represented in FIG. 2B by mass 50 that is blocking effluent outlet 24. Clogging typically occurs at the fluid-air interface 48 because of the natural tendency of the solids in the effluent to float on the surface of the liquid. When solids on the surface of the liquid contact the side of the outlet pipe 44 at the fluid-air interface 48 they tend to adhere to the pipe 44. This creates a cascade effect that leads to the accumulation of more solids at the fluid air interface 48, which eventually leads to total blockage of the effluent outlet 24. One will of course appreciate that failure to clear clogging in the effluent outlet can be dangerous because of the build-up of pressure caused by the biodegradation of solids in the reactor.

Because of the hazards posed by the formation of clogs in the effluent outlet 24, the present invention includes various devices and methods for clearing accumulated solids from the effluent outlet 24. Referring again to FIG. 1, a reactor 10 with an effluent outlet 24 that includes an auger assembly 34a in the effluent outlet 24 is depicted. The auger assembly 34a is inserted into the effluent outlet such that it is positioned at or through the fluid-air interface 48 in order to prevent clogging of the effluent outlet by solids in the effluent stream. The auger assembly 34a includes a screw conveyor 38 (i.e., an auger) and a drive assembly 40. A screw conveyor 38 is typically a helical screw having a longitudinal axis that can, when rotated either clockwise or counter-wise, draw solid material up and out of the effluent outlet 24 and/or push solid material in the effluent outlet back into the vessel 12.

Figure 3:
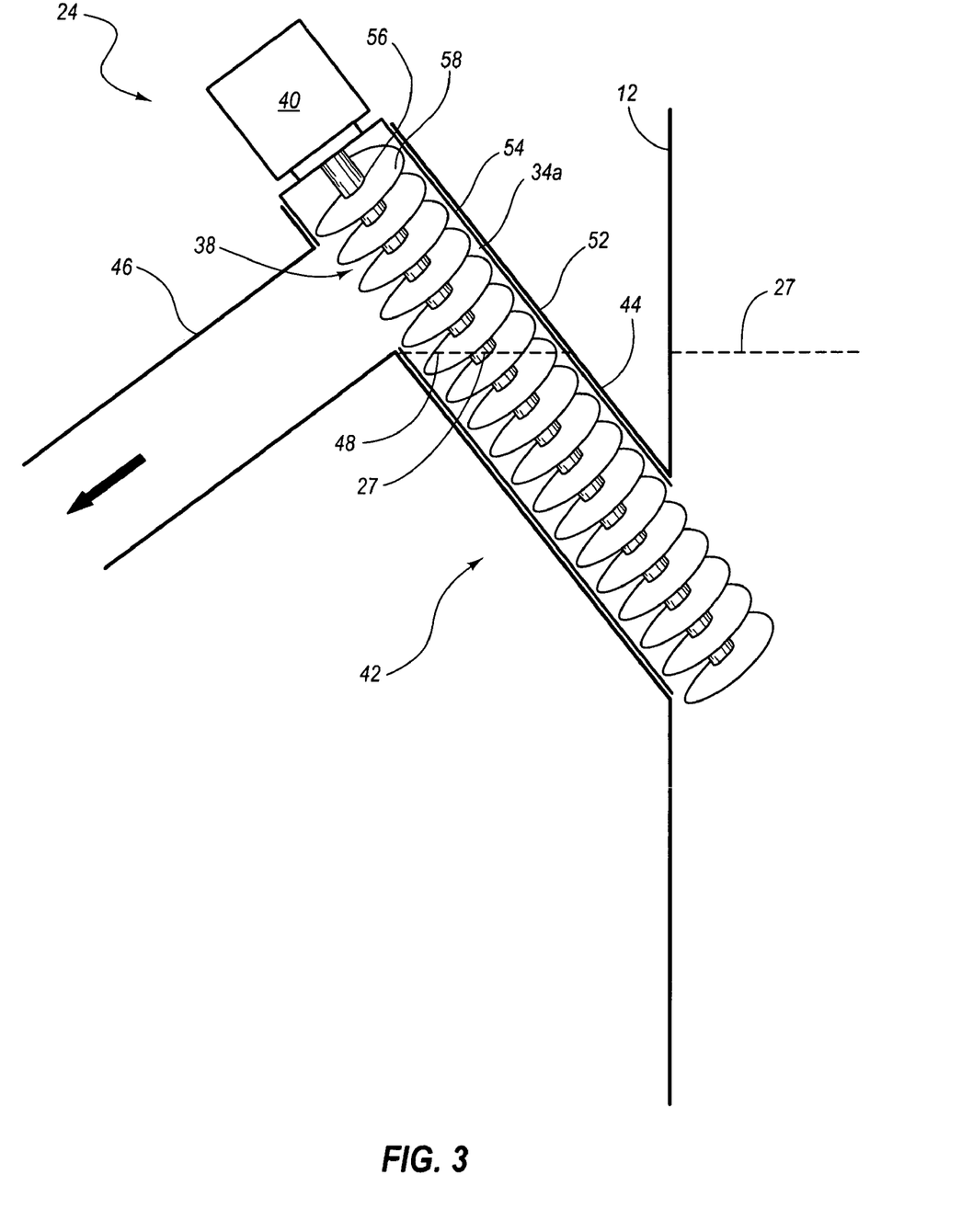
FIG. 3 illustrates an example of another embodiment of an effluent outlet that includes another auger assembly.

Referring now to FIG. 3, the effluent outlet 24 and the auger assembly 34a are shown in greater detail. In FIG. 3 it can be seen more clearly that the auger assembly 34a includes a screw 38 and a drive assembly 38. The screw conveyor 38 further includes a shaft 56 and a plurality of angled flights 58. The auger assembly 34a also includes a drive assembly 40 that generates and/or transfers a force for turning screw conveyor 38 via shaft 56. For example, the drive assembly 40 can include an electric drive motor, an explosion-proof housing to isolate any electrical discharge from the explosive gasses in the reactor, and a plurality of bearing surfaces (i.e., axial bearings, thrust bearings, and hybrid axial/thrust bearings) to facilitate rotation of the auger.

In one embodiment, the screw conveyor includes an outer housing 52 and a sleeve housing 54 that at least partially enclose the screw conveyor 38. The outer housing 52 and the sleeve housing 54 are inserted into the effluent outlet 24 such that the screw conveyor 38, the outer housing 52, and the sleeve housing 54 can readily be coupled to the effluent outlet 24 or uncoupled so that the auger assembly 34a can be removed for repair or replacement.

Figure 4:
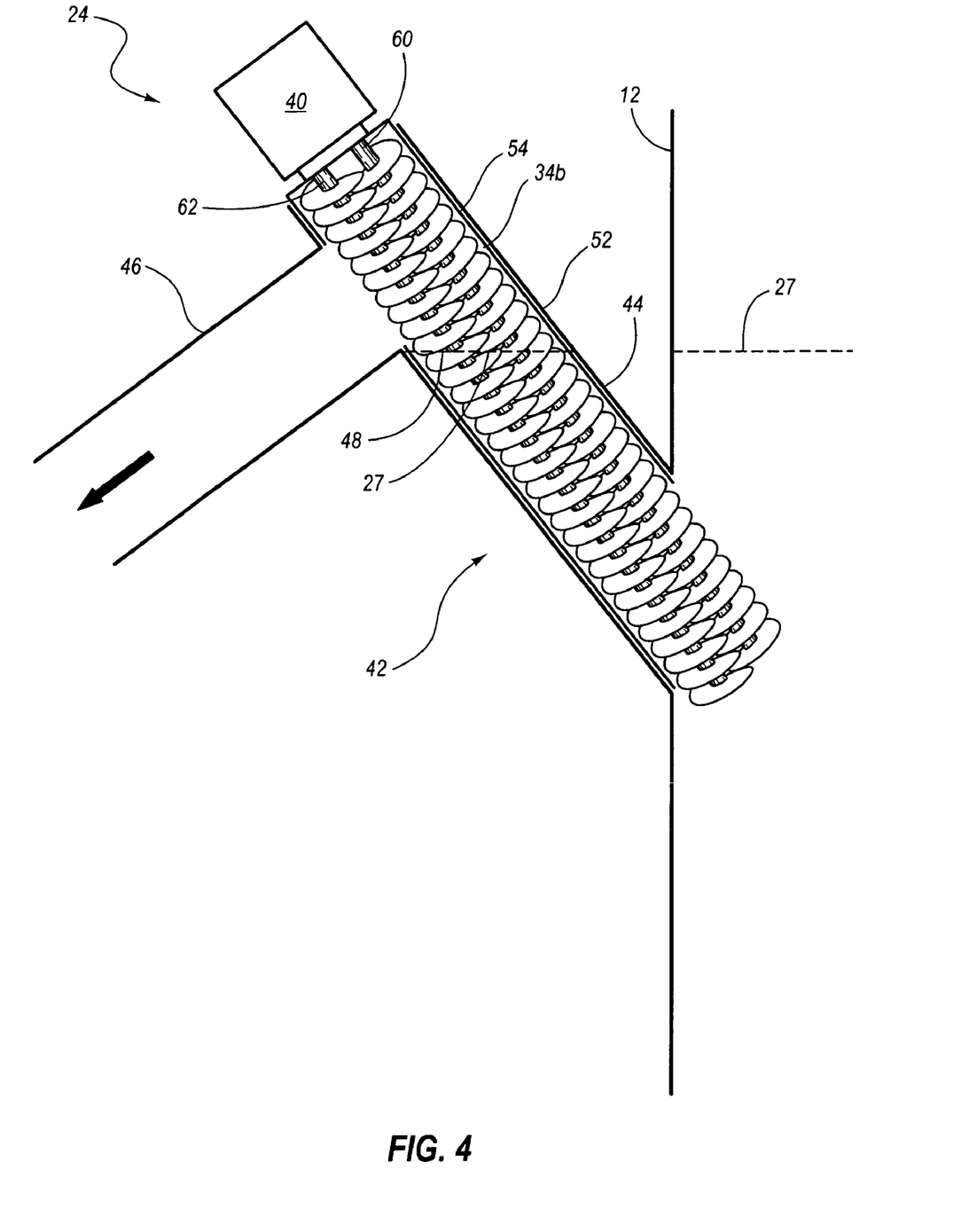
FIG. 4 illustrates an example of one embodiment of an effluent outlet that includes a screw pump having two intermeshing helical screws.

Referring now to FIG. 4, an effluent outlet 24 having an auger assembly 34b according to one embodiment of the present invention is depicted. The auger assembly 34b depicted in FIG. 4 is similar in many respects to the auger assembly 34a depicted in FIGS. 1 and 3, except auger assembly 34b has two intermeshing helical screw conveyors 60 and 62 that rotate axially about one another so as to pump fluid and material out of the effluent outlet 24. An auger assembly having more than one helical screw conveyor is typically referred to as a screw pump. A screw pump may be advantageous because the mechanical vibration produced by a screw pump is typically low, which may minimize churning and foaming.

Auger assembly 34b includes a drive assembly 40 that drives one screw conveyor, which is referred to as the power screw conveyor 60. Because the screw conveyors intermesh with one another, rotation of the power screw conveyor 60 drives rotation of the second screw conveyor 62, which is referred to as the idler. Preferably, at least one of the helical screws of the screw pump pierces or passes through the fluid-air interface 48 such that rotation of the two intermeshing helical screws 60 and 62 disrupts solids that tend to collect at the fluid-air interface.

Figure 5:
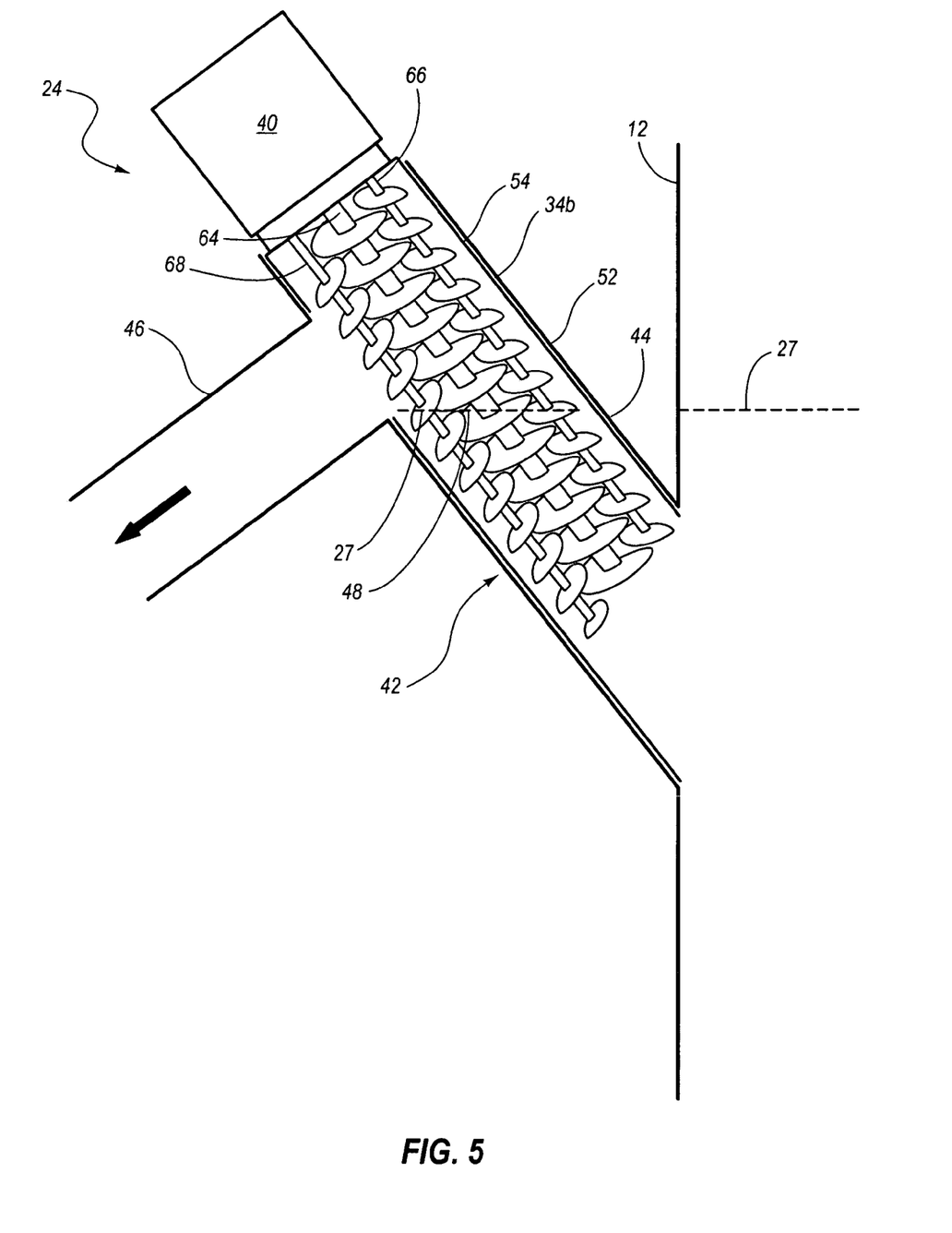
FIG. 5 illustrates an example of one embodiment of an effluent outlet that includes a screw pump having three intermeshing helical screws.

Referring now to FIG. 5, an effluent outlet 24 having an auger assembly 34c according to one embodiment of the present invention is depicted. Auger assembly 34c depicted in FIG. 5 is similar in many respects to the auger assembly 34a depicted in FIGS. 1 and 3, except auger assembly 34c has three intermeshing helical screw conveyors 64, 66, and 68 that rotate axially about one another so as to pump fluid and material out of the effluent outlet 24.

Auger assembly 34c includes a drive assembly 40 that drives one screw conveyor, which is referred to as the power screw conveyor 64. Because the screw conveyors intermesh with one another, rotation of the power screw conveyor 64 drives rotation of the second and third screw conveyors 66 and 68, which are referred to as the idlers. Preferably, at least one of the helical screws of the screw pump pierces or passes through the fluid-air interface 48 such that rotation of the three intermeshing helical screws 64, 66, and 68 disrupts solids that tend to collect at the fluid-air interface.

In one embodiment, the present invention includes a method for continuous operation of an upflow anaerobic reactor for biodegradation of biodegradable matter and collecting biogas produced therefrom. The method includes steps of (1) providing an upflow anaerobic reactor that includes an effluent outlet having a fluid-filled gas trap and an auger assembly coupled to the effluent outlet, (2) providing a bacterial culture comprising a sludge layer in the lower portion of the vessel for biodegradation of biodegradable material and production of biogas therefrom, (3) operating the upflow anaerobic reactor so as to create an upflow in the vessel by introducing an influent containing biodegradable material into the lower portion of the vessel via the inlet, and withdrawing an effluent from the upper portion of the vessel via the effluent outlet, and (4) rotating the auger assembly so as to disrupt solid material contained in the effluent from the fluid-air interface.

In one embodiment, the screw conveyor can be rotated continuously or semi-continuously in order to save energy and prevent unnecessary wear. The interval between rotations of the screw conveyor may depend on the amount of solid matter in the effluent.

In one embodiment, the upflow anaerobic reactor further includes a pressure sensor for monitoring gas pressure in the vessel. The pressure sensor is preferably coupled to the auger assembly or the screw pump device in the effluent outlet. In one embodiment, a rise in pressure indicates a clog of solid material in the effluent outlet, which actuates the drive assembly and initiates rotation of the screw conveyor so as to clear that The present invention may be embodied in other specific forms without departing from its spirit or essential characteristics. The described embodiments are to be considered in all respects only as illustrative and not restrictive. In particular, elements of the depicted embodiment may be combined with elements of other depicted embodiments without departing from the spirit or essential characteristics of the present invention. The scope of the invention is, therefore, indicated by the appended claims rather than by the foregoing description. All changes which come within the meaning and range of equivalency of the claims are to be embraced within their scope.

What is claimed is:

1. A method for operating an upflow anaerobic reactor for digesting biodegradable matter and collecting biogas produced therefrom, the method comprising:

providing an upflow anaerobic reactor for anaerobically digesting biodegradable matter using a bacterial culture, the upflow anaerobic reactor comprising:

a vessel having an upper portion of the vessel and a lower portion that define a volume of the vessel, an effluent outlet coupled to the upper portion of the vessel, wherein the effluent outlet includes a fluid-filled gas-trap having a fluid-air interface for preventing escape of biogas through the effluent outlet, an auger assembly operatively coupled to the effluent outlet and positioned at or through the fluid-air interface, an inlet coupled to the vessel for introducing biodegradable matter into the lower portion of the vessel, and a gas port coupled to the upper portion of the vessel for collecting biogas produced in the vessel, providing a bacterial culture comprising a sludge layer in the lower portion of the vessel for biodegradation of biodegradable material and production of biogas therefrom;

operating the upflow anaerobic reactor so as to create an upflow in the vessel by introducing an influent including biodegradable material into the lower portion of the vessel via the inlet, and withdrawing an effluent from the upper portion of the vessel via the effluent outlet; and operating the auger assembly so as to disrupt solid material contained in the effluent that collects at the fluid-air interface.

2. A method as recited in claim 1, wherein the auger assembly includes at least one helical screw conveyor that pierces the fluid-air interface and rotates so as to remove solid material from the fluid-air interface.

3. A method as recited in claim 1, wherein the auger assembly includes and auger or a screw pump.

4. A method as recited in claim 3, wherein the effluent outlet defines a fluid level in the vessel.

5. A method as recited in claim 1, wherein the effluent outlet includes a column of liquid configured so as to prevent escape of biogas from the vessel through the effluent outlet.

6. A method as recited in claim 1, wherein the upflow anaerobic reactor further includes a septum positioned below the effluent outlet in the upper portion of the vessel so as to maintain the bacterial culture in the lower portion of the vessel below the septum, the septum having a central aperture for allowing digested biodegradable matter and liquid to flow from the lower portion of the vessel to the upper portion of the vessel.

7. A method as recited in claim 6, the upflow anaerobic reactor further comprising an internal auger device operatively coupled to the vessel and positioned within the aperture so as to prevent clogging of the aperture.

8. An upflow anaerobic reactor, comprising:

a vessel having lower portion and an upper portion of the vessel;

an effluent outlet coupled to the upper portion of the vessel for directing an effluent stream out of the vessel, wherein the effluent outlet includes a fluid-filled gas-trap having a fluid-air interface for preventing escape of biogas through the effluent outlet;

an auger assembly operably coupled to the effluent outlet, wherein the auger assembly is positioned at or through the fluid air interface so as to disrupt solids that collect at the fluid-air interface;

an inlet coupled to the lower portion of the vessel for introducing biodegradable matter into the vessel; and a gas outlet coupled to the upper portion of the vessel for collecting biogas produced in the vessel.

9. An upflow anaerobic reactor as recited in claim 8, further comprising a bacterial culture contained in the vessel, wherein the bacterial culture is includes least one species of anaerobic bacteria selected for digestion of the biodegradable matter and production of biogas therefrom.

10. An upflow anaerobic reactor as recited in claim 8, wherein the effluent outlet defines a fluid level in the vessel.

11. An upflow anaerobic reactor as recited in claim 10, wherein the effluent outlet further includes a column of liquid configured so as to prevent escape of biogas from the vessel through the effluent outlet.

12. An upflow anaerobic reactor as recited in claim 8, wherein the at least one screw conveyor is configured to draw solid material up and out of the effluent outlet and/or to push solid material in the effluent outlet back into the vessel.

13. An upflow anaerobic reactor as recited in claim 8, wherein the auger assembly includes at least one screw conveyor with a longitudinal axis.

14. An upflow anaerobic reactor as recited in claim 13, wherein the auger assembly includes a drive assembly for rotating the at least one screw conveyor.

15. An upflow anaerobic reactor as recited in claim 14, wherein the drive assembly is capable of rotating the at least one screw conveyor either continuously or semi-continuously.

16. An upflow anaerobic reactor as recited in claim 13, the screw conveyor further comprising an outer housing and a sleeve housing that at least partially enclose the screw conveyor, wherein the outer housing and the sleeve housing are inserted into the effluent outlet such that the screw conveyor, the outer housing, and the sleeve housing can readily be uncoupled from the effluent outlet.

17. An upflow anaerobic reactor as recited in claim 8, wherein the auger assembly includes a screw pump coupled to the effluent outlet.

18. An upflow anaerobic reactor as recited in claim 17, wherein the screw pump includes a housing that contains two or more intermeshing helical screws that rotate axially about one another so as to pump fluid and material through the housing and out the effluent outlet.

19. An upflow anaerobic reactor as recited in claim 8, the vessel further comprising a septum having a central aperture, the septum being positioned in the upper one-third of the vessel to maintain the bacterial culture below the septum.

20. An upflow anaerobic reactor as recited in claim 19, the upflow anaerobic reactor further comprising an internal auger device operatively coupled to the vessel and positioned within the aperture so as to prevent clogging of the aperture.

21. An upflow anaerobic reactor configured to contain a bacterial culture for biodegradation of biodegradable material and biogas production, the upflow anaerobic reactor comprising:

a vessel having an upper portion and a lower portion;

an effluent outlet coupled to the upper portion of the vessel for directing an effluent stream out of the vessel, wherein the effluent outlet includes a fluid-filled gas-trap having a fluid-air interface for preventing escape of biogas through the effluent outlet;

a first auger device operably coupled to the effluent outlet, wherein the first auger device is configured to disrupt solid material in the effluent that collects at the fluid-air interface, the first auger device comprising a screw conveyor, a sleeve housing that at least partially surrounds the screw conveyor, and a drive assembly that rotates the screw conveyor;

an inlet coupled to the lower portion of the vessel, wherein the inlet is configured for introducing biodegradable matter into the vessel;

a gas outlet coupled to the upper portion of the vessel, wherein the gas outlet is configured for collecting biogas produced in the vessel;

a septum having a central aperture, wherein the septum is positioned in the upper portion of the vessel to maintain a bacterial culture below the septum; and a second auger device operatively coupled to the vessel and positioned within the aperture so as to prevent clogging of the aperture.

22. An upflow anaerobic reactor as recited in claim 21, the upflow anaerobic reactor further comprising a pressure sensor for monitoring gas pressure in the vessel, the pressure sensor being coupled to the first auger device, wherein a rise in pressure indicates a clog of solid material in the effluent outlet, and wherein the rise in pressure actuates the drive assembly and initiates rotation of the screw conveyor so as to clear the clog in the effluent outlet.

* * * * *